United States Patent
Niemela et al.

(10) Patent No.: US 11,938,873 B2
(45) Date of Patent: Mar. 26, 2024

(54) REPOSITIONABLE TOILET FOR PORTABLE LIVING QUARTERS

(71) Applicant: NB4 Brand L.L.C., Chassell, MI (US)

(72) Inventors: Marcus Niemela, Scottsdale, AZ (US); Michael R. Jackson, Hancock, MI (US)

(73) Assignee: The Kingstar Company, Chassell, MI (US)

( * ) Notice: Subject to any disclaimer, the term of this patent is extended or adjusted under 35 U.S.C. 154(b) by 0 days.

(21) Appl. No.: 17/894,298

(22) Filed: Aug. 24, 2022

(65) Prior Publication Data

US 2023/0064596 A1 Mar. 2, 2023

Related U.S. Application Data

(60) Provisional application No. 63/236,309, filed on Aug. 24, 2021.

(51) Int. Cl.
*B60R 15/04* (2006.01)
*A47K 11/02* (2006.01)
*B60R 15/02* (2006.01)

(52) U.S. Cl.
CPC ............ *B60R 15/04* (2013.01); *A47K 11/02* (2013.01); *B60R 15/02* (2013.01)

(58) Field of Classification Search
CPC .......... B60R 15/04; B60R 15/02; A47K 11/02
USPC ...................................... 4/458, 449
See application file for complete search history.

(56) References Cited

U.S. PATENT DOCUMENTS

| 11,006,793 | B1* | 5/2021 | Boudreaux | ............ A47K 11/02 |
| 11,357,361 | B1* | 6/2022 | Wright | ................. E04H 1/1216 |
| 11,700,981 | B1* | 7/2023 | Boudreaux | ............ A47K 11/02 4/476 |
| 2023/0061537 | A1* | 3/2023 | van der Linde | ....... A47K 11/02 |

FOREIGN PATENT DOCUMENTS

CN 111845587 A * 10/2020

* cited by examiner

*Primary Examiner* — Lori L Baker
(74) *Attorney, Agent, or Firm* — Gardner, Linn, Burkhart & Ondersma LLP

(57) ABSTRACT

A repositionable toilet system for a bathroom or water closet of an RV, camper, boat, or other portable living quarter, allows for a dry bath (including a shower stall that can be somewhat isolated from the toilet) without permanently sacrificing otherwise useful floor space within the living quarter. The toilet is supported on a moveable platform that is repositionable between a stowed position in which the toilet is inside of the shower stall and a deployed/extended position in which the toilet is outside the shower stall. The moveable platform may be locked at the stowed or deployed position during travel or during use of the living quarter. The toilet may be fully self-contained, refillable, and emptyable, or the toilet may be plumbed into the water supply and waste collection system of the RV or camper, such as with flexible supply and drain lines.

20 Claims, 13 Drawing Sheets

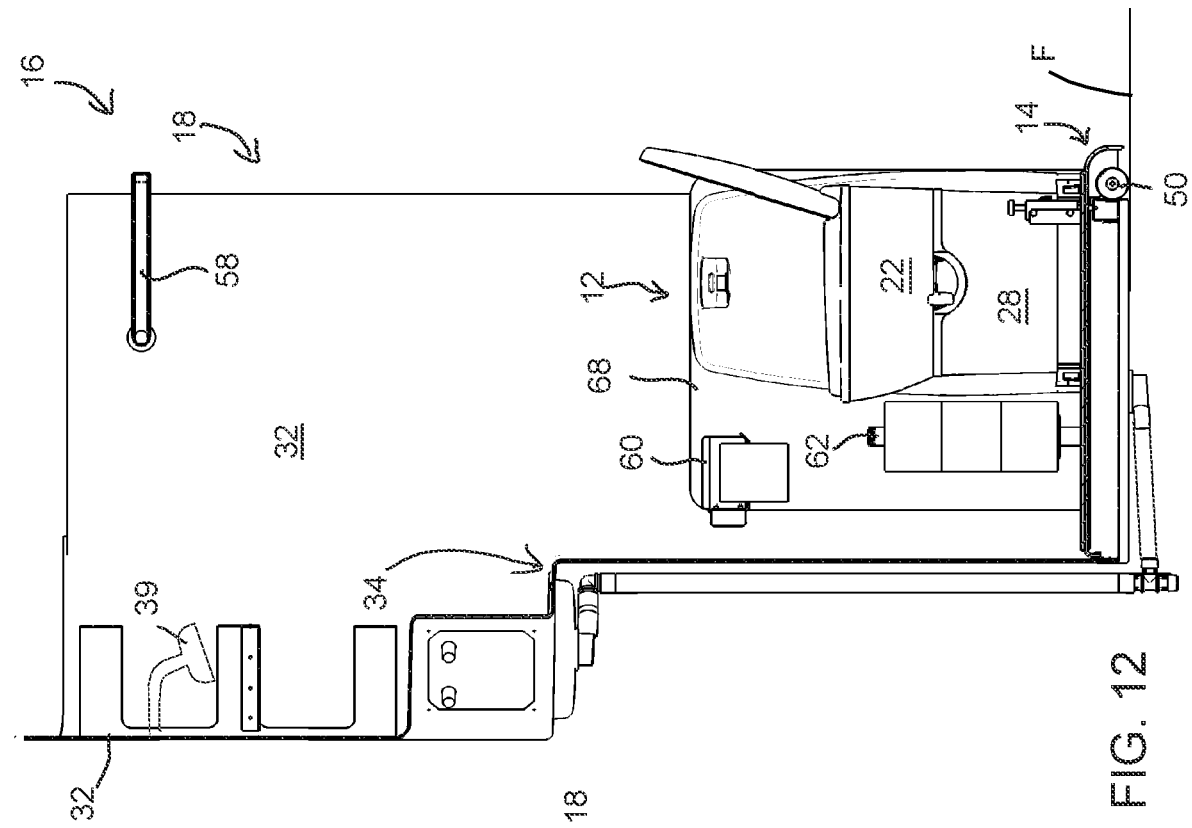
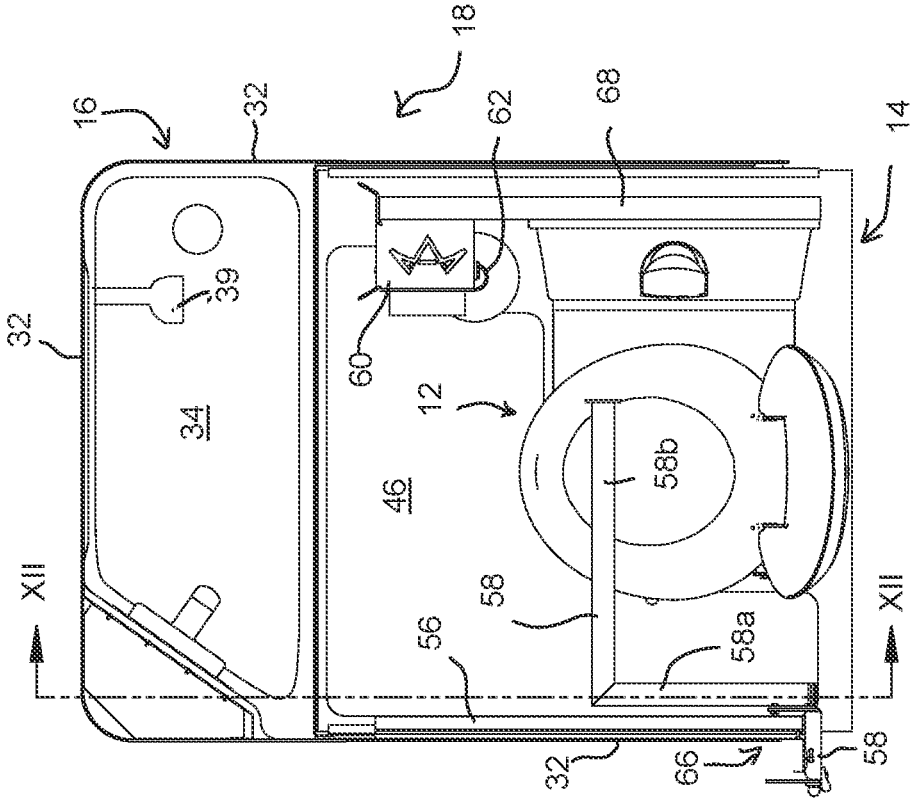
FIG. 12
FIG. 11

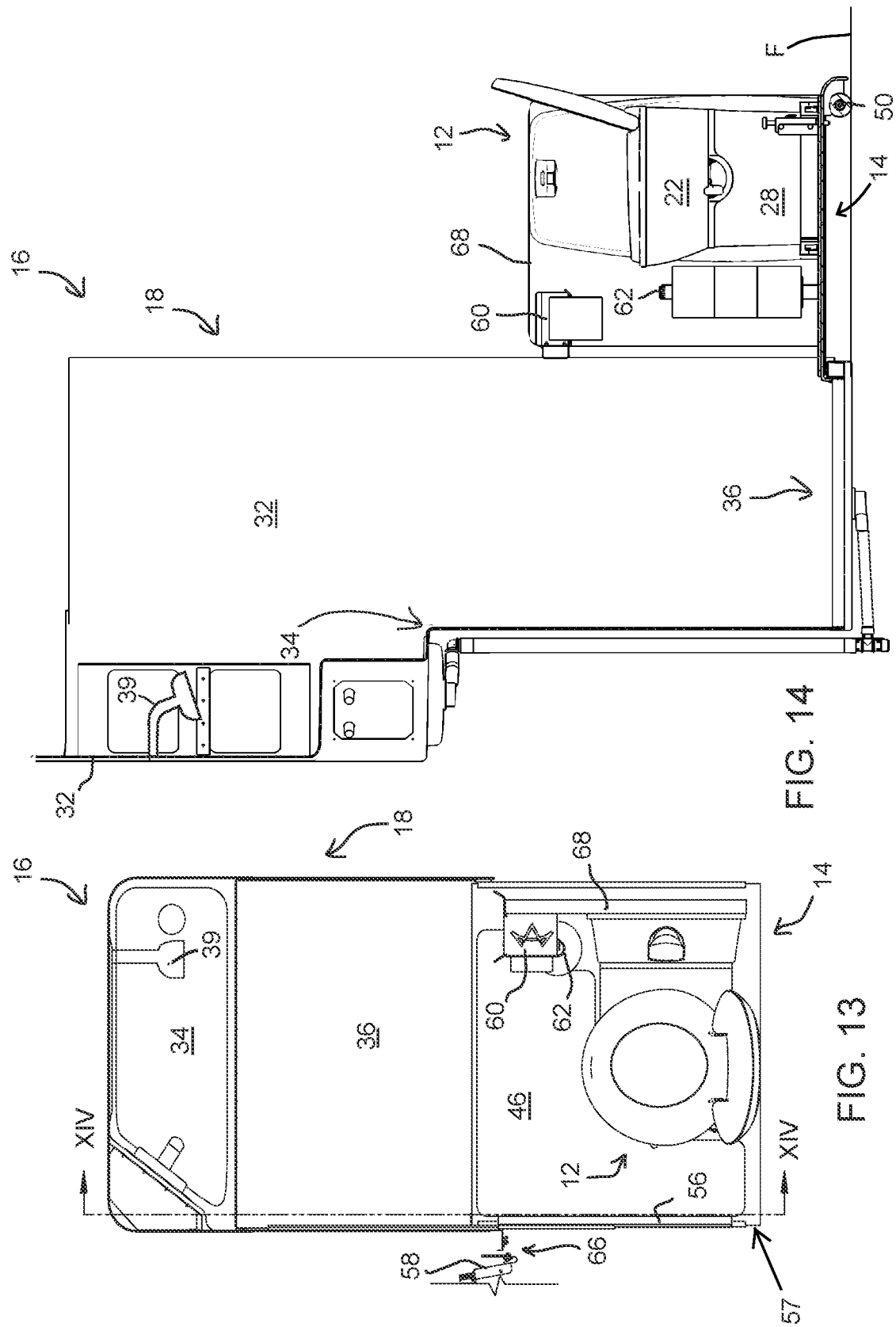

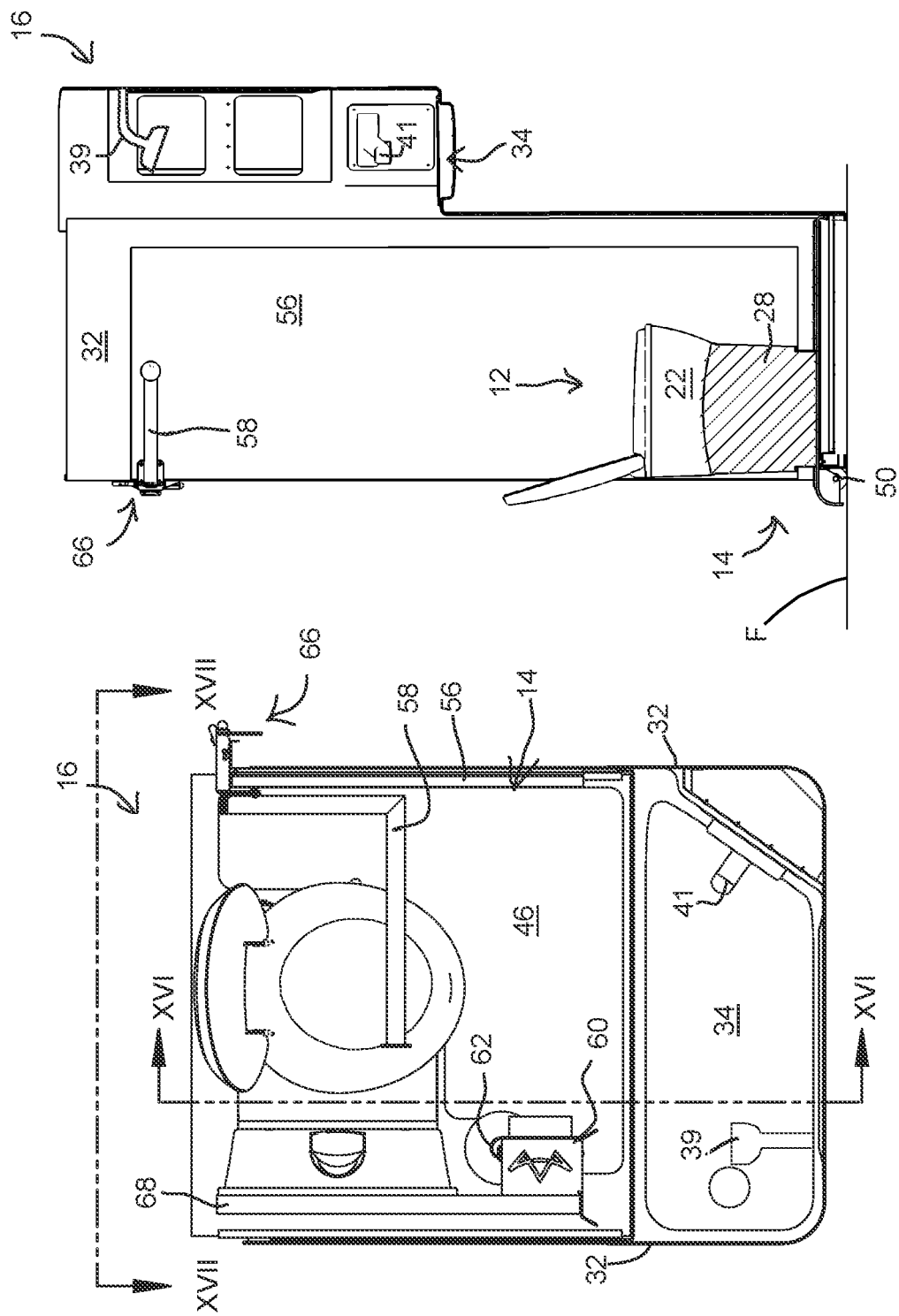

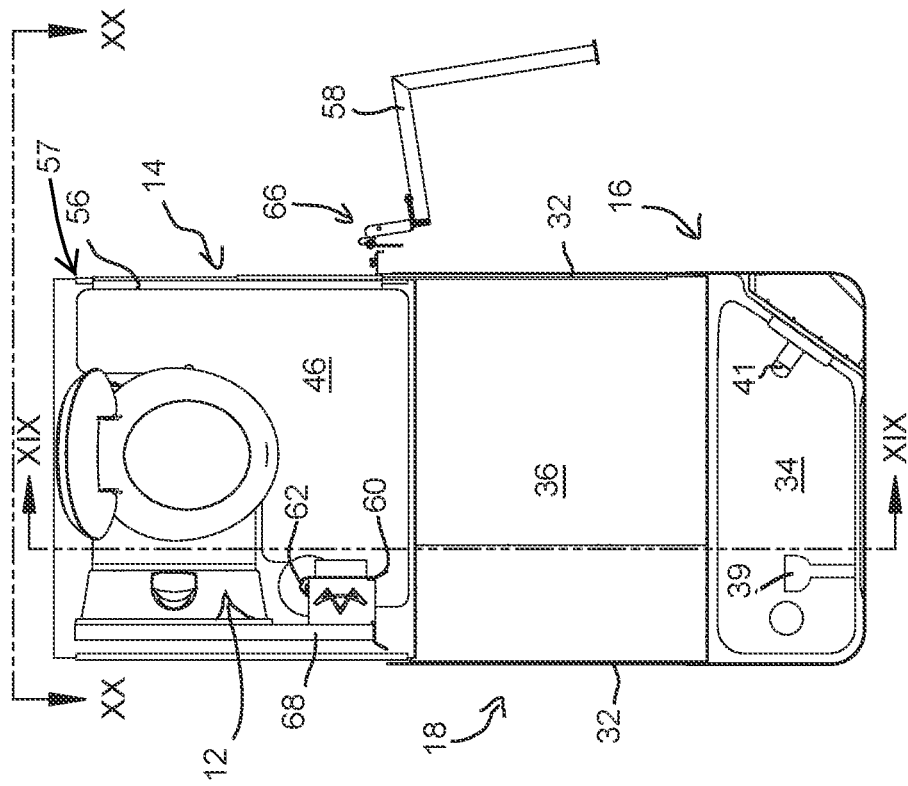
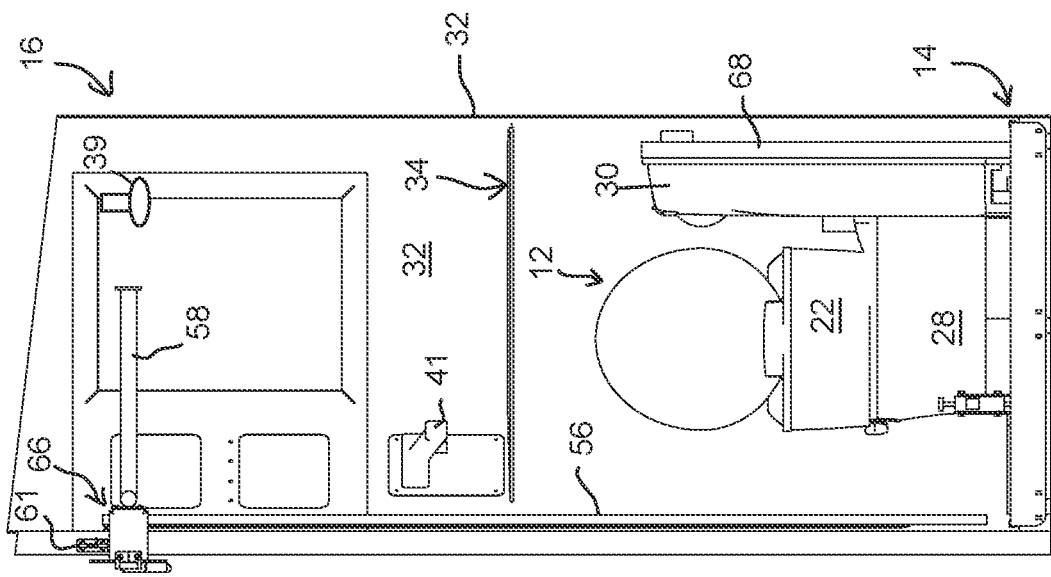
FIG. 18
FIG. 17

REPOSITIONABLE TOILET FOR PORTABLE LIVING QUARTERS

CROSS REFERENCE TO RELATED APPLICATION

The present application claims priority of U.S. provisional application Ser. No. 63/236,309 filed Aug. 24, 2021, which is hereby incorporated by reference herein in its entirety.

FIELD OF THE INVENTION

The present invention is directed to personal hygiene systems for a portable living quarter, such as a camper.

BACKGROUND OF THE INVENTION

Portable living quarters (e.g. recreational vehicles, camper trailers, truck campers, etc.) commonly include a personal hygiene system, bathroom, or water closet that may include amenities such as showers, baths, toilets, sinks, vanity cabinets, etc. Space is often limited by the dimensions and/or load bearing capacity of the vehicle powering or hauling the portable living quarter. Thus, in order to fit into the limited space, personal hygiene systems in such living quarter commonly utilize small components (e.g. shower stalls, toilet, sinks, etc.) relative to their standard household counterparts. Some personal hygiene systems for portable living quarters utilize a "wet bath" configuration in which a toilet is installed inside of a shower stall and the toilet is exposed to shower water while the shower is operating. In other words, the toilet gets wet whenever the shower is operating. Conversely, some personal hygiene systems for portable living quarters utilize a "dry bath" configuration in which the toilet is installed alongside or adjacent a shower stall such that the toilet is separated from the shower water when the shower is operating. Dry baths typically require a substantially larger footprint than wet baths.

SUMMARY OF THE INVENTION

The present invention provides a repositionable toilet system or hygiene system for an RV, camper, mobile home, boat, or other living quarter where floor space is limited. The toilet is attached to a moveable platform that is horizontally slideable. The repositionable toilet system is particularly well-suited for placement within a shower stall such that the toilet can be stowed inside the shower stall and deployed/extended outside the shower stall. Thus, the repositionable toilet system provides an accessible water closet or bathroom with a full-size shower and an easily accessible toilet when either is desired, and also provides additional floor space when the shower and/or toilet are not needed. While the shower and toilet are both likely to be more comfortable to use when the toilet is deployed, both the shower and toilet remain fully functional when the toilet is stowed inside the shower. The toilet is preferably self-contained without any moving supply or drain lines. However, it is contemplated that flexible supply and drain lines may be provided to enable automatic functioning of the toilet (i.e. flushing and clean water refill to and from remote locations in the living quarter). The toilet may be flushable and/or the toilet may be a composting or incinerator type toilet. Additional equipment items may be supported on the moveable platform, either along with the toilet or as an alternative to the toilet (e.g. cabinets, a drawer chest, a vanity counter, a desk, toilet paper holders, curtain hooks, privacy walls or screens, etc.).

According to one form of the present invention, a repositionable toilet system or hygiene system is provided for a mobile or portable living quarter with limited floor space. The toilet system includes a toilet having a bowl and a waste holding tank disposed below the bowl. The toilet may be fully self-contained, such as a cassette toilet as described in further detail below. The toilet is fixed to a moveable or translatable platform which supports the toilet such that the toilet is horizontally slideable between stowed and deployed positions. The platform is moveably supported on a fixed support device, such as a set of slide guides, which supports the repositionable toilet system at an adjacent structure, such as at a lower portion of a shower stall, for example. The moveable platform includes a panel or base that translates or slides horizontally relative to the support device. The toilet is fixedly coupled to the platform such that the toilet is moveable with the platform between a stowed position and an extended deployed position. With the platform in the stowed position the platform is generally above and covering the support device and with the platform in the extended position the support device is generally uncovered by the platform. Optionally, the toilet system may include a lock to secure the platform in either of the stowed or deployed positions. Further optionally, the moveable platform may include a wheel attached to the underside of an outward or distal end of the platform to support the distal end along a floor surface subjacent to the platform.

In one aspect, the moveable platform is provided along with a shower stall and the fixed support device is coupled to a portion of the shower stall near the shower floor. As such, with the platform in the stowed position the toilet is positioned substantially within an envelope of the shower stall, and with the platform in the extended position the toilet is positioned substantially outside of the envelope of the shower stall. An outward or distal end of the platform is extendable outward from the shower stall and above a floor surface adjacent the shower stall. The optional wheel may support the distal end along the floor surface adjacent the shower stall as the platform extends and retracts between the stowed and deployed positions. A shower system may be provided with the shower stall including a water dispenser at an upper portion of the shower stall and a drain at a floor of the shower stall. The shower stall contains water dispensed from the dispenser and directs the water toward the drain.

In another aspect, a privacy panel or wall is included with the toilet system and slideably mounted to a portion of the living quarter, such as at a wall of the shower stall. The privacy panel seals at least a portion of an opening between the entryway to the water closet and another portion of the living quarter (e.g. a living room or parlor of the living quarter) to provide privacy for an occupant on either side of the privacy wall. The privacy panel is moveable between an open/stowed position with the panel positioned substantially within the envelope of the shower stall and an extended/privacy position substantially outside the envelope of the shower stall. The privacy panel may be independently moveable relative to the platform supporting the toilet, such that the privacy panel may be extended while the platform is stowed and vice versa. Alternatively, the privacy panel may be coupled to the platform in a manner such that the privacy panel deploys and stows along with the platform.

In yet another aspect, a repositionable equipment hanger is provided with the repositionable toilet system and attached to a portion of the living quarter, such as a wall adjacent to the water closet. The hanger includes a horizontal bar or rod for support equipment, such as clothing on clothing hangers. The hanger is moveable between a first position with the hanger within the envelope of the shower stall and water closet and a second position with the hanger outside the shower stall, such as inside the rest of the living quarter adjacent the water closet (e.g. inside the living room or parlor).

In still another aspect, the waste holding tank of the toilet is a removable tank, in the form of a removable cassette, permits a user to remove and empty the contents of the waste holding tank when desired or as necessary. Preferably, the cassette is easily accessible and removable from the toilet when the toilet is in the extended position relative to the shower stall.

According to still another form of the present invention, a repositionable platform system is provided for a portable living space having a closet or mixed-use space, such as an adaptable compartment, reading nook, or a shower stall configured to receive the stowed platform. The repositionable platform system includes a moveable platform supporting an equipment item (e.g. a flushable toilet, a composting toilet, an incinerator type toilet, a drawer chest, an armoire, a vanity counter, a desk, a table, etc.) relative to the closet. The moveable platform includes a fixed support device which supports the repositionable toilet system at a lower portion of the closet near the floor of the closet, such as at a curb of a shower stall floor. The moveable platform includes a support panel or base slideably supported by the fixed support device such that the support panel is horizontally extendable relative to the support device between a stowed position and an extended position. With the platform in the stowed position the equipment item is positioned substantially within an envelope of the closet, such as within a shower stall, and with the platform in the extended position the equipment item is positioned substantially outside of the envelope of the closet, such as outside a shower stall.

Accordingly, embodiments of the present invention provide a space-efficient bathroom system for confined living quarters, such as in bathrooms or water closets of RVs, camper trailers, truck campers, etc. The system includes a self-contained toilet supported on a moveable platform that is at least partially supported within a shower stall. The moveable platform is extendable and retractable out of and into the shower stall. As such, a user can extend the toilet out of the shower stall to access and use the shower and the toilet independently. Advantageously, the system only requires about the amount of floor space as the shower stall when the system is stowed, and also provides a dry bath configuration when the toilet system is extended (i.e. the toilet is not positioned in the shower stall). The moveable platform may be extendable into another area of the living quarter, such as a hallway, for example. Thus, when the toilet system is stowed inside the shower, the other area of the living quarter is available for other uses (e.g. walking between a bedroom and a kitchen area of the living quarter).

These and other objects, advantages, purposes and features of this invention will become apparent upon review of the following specification in conjunction with the drawings.

BRIEF DESCRIPTION OF THE DRAWINGS

FIG. 11 is a top plan view of the repositionable toilet of FIG. 10, shown installed at a shower system for a portable living quarter having a privacy panel and a clothing hanger, depicted with the toilet and privacy wall in a stowed position and the clothing hanger positioned inside the shower system;

FIG. 12 is a sectional view taken along line XII-XII of FIG. 11;

FIG. 13 is a top plan view of the repositionable toilet and shower system of FIG. 11, depicted with the toilet and privacy wall in a deployed position and the clothing hanger positioned outside the shower stall;

FIG. 14 is a sectional view taken along line XIV-XIV of FIG. 13;

FIG. 15 is another top plan view of the repositionable toilet and shower system of FIG. 11, shown rotated 180° as compared to FIG. 11;

FIG. 16 is a sectional view taken along line XVI-XVI of FIG. 15;

FIG. 17 is a sectional view taken along line XVII-XVII of FIG. 15;

FIG. 18 is another top plan view of the repositionable toilet and shower system of FIG. 13, shown rotated 180° as compared to FIG. 13 and depicting the clothing hanger positioned fully outside the shower stall;

DESCRIPTION OF THE PREFERRED EMBODIMENTS

Figure 1:
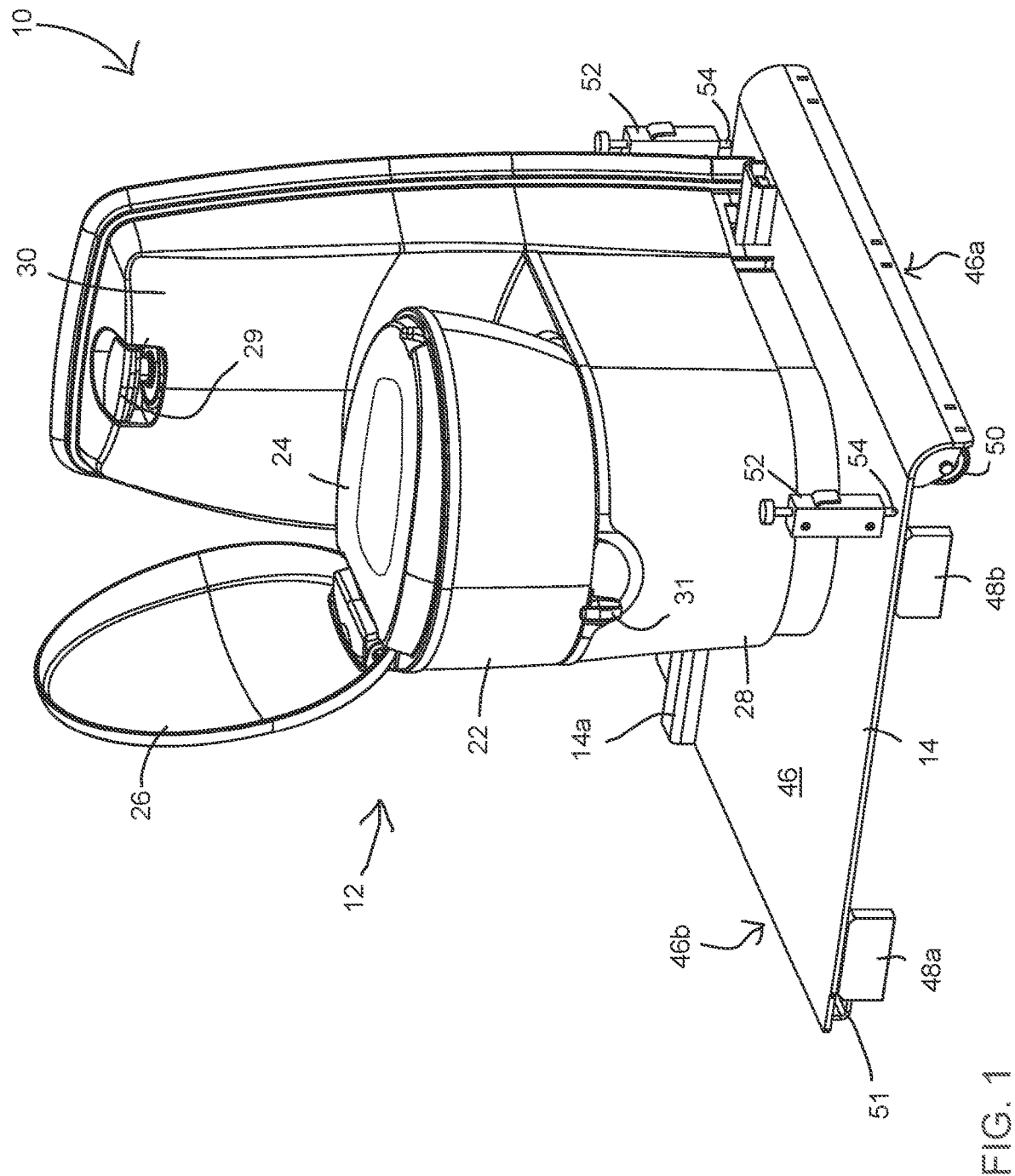
FIG. 1 is a front-side perspective view of a repositionable toilet for a portable living quarter, in accordance with the present invention.

Referring now to the drawings and the illustrative embodiments depicted therein, a personal hygiene system, in the form of a repositionable toilet or commode system 10, is provided for a portable living quarter, such as a recreational vehicle (RV), camper trailer, or truck camper, for example (FIGS. 1-9). The toilet system 10 includes a toilet 12 and a moveable or repositionable toilet support platform 14. The toilet system 10 is preferably provided along with a shower system 16 (FIGS. 2-5) for a bathroom or water closet of the portable living quarter. The platform 14 allows the toilet 12 to move between a stowed position within the envelope 18a of a stall 18 of the shower system 16 (FIGS. 2 and 3) and a deployed/extended position outside of the shower stall 18 (FIGS. 4 and 5) to provide substantially full access to the shower stall 18 and toilet 12 when the toilet system 10 is deployed. In the stowed position, the toilet system 10 is retracted into the shower stall 18 to permit a user access to the floor F adjacent the shower stall 18. That portion of the floor F adjacent the shower stall may represent a walkway leading between different portions of the living quarter, for example. Thus, the repositionable toilet system 10 provides a "dry bath" configuration for the living quarter while only occupying about the same or slightly more space than a commonly known "wet bath" configuration in which a toilet is mounted permanently in a shower stall. The toilet is preferably flushable, however, the toilet may optionally be a composting toilet that is either flushable or non-flushable. It will be appreciated that while the depicted embodiment of the invention is particularly well suited for providing a repositionable toilet, the moveable platform may be adapted for supporting various other equipment items. For example, the moveable platform may support a vanity cabinet with an extendable chair or seat which are extendable from the shower stall 18. It will be further appreciated that while the depicted embodiment of the invention is particularly well suited for providing a repositionable toilet or platform in a shower stall, the moveable platform may be adapted for stowage in and extension from a closet or other mixed-use space without shower components.

Figure 9:
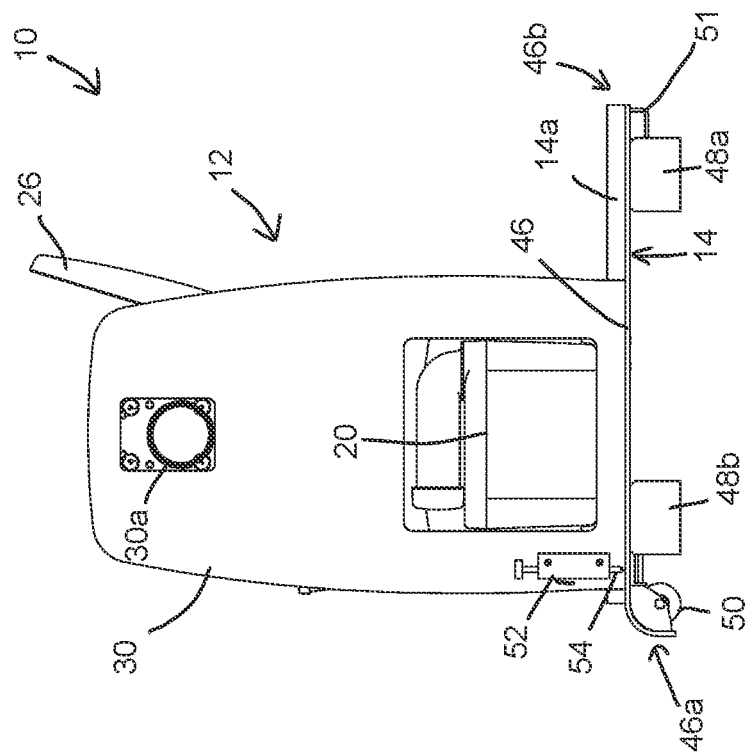
FIG. 9 is a rear elevation view of the repositionable toilet of FIG. 1.
Figure 8:
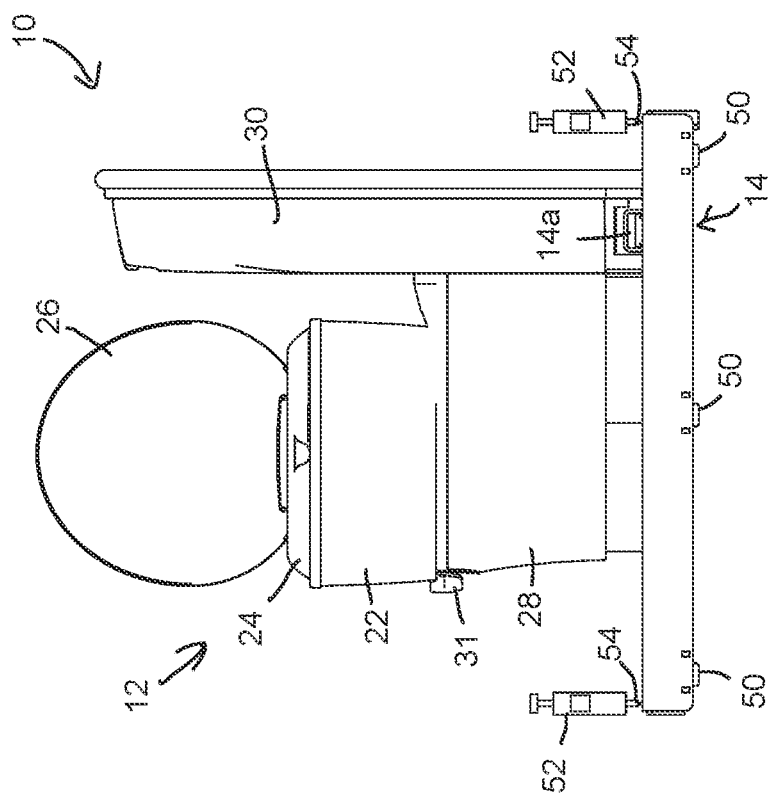
FIG. 8 is a side elevation view of the repositionable toilet of FIG. 1.
Figure 10:
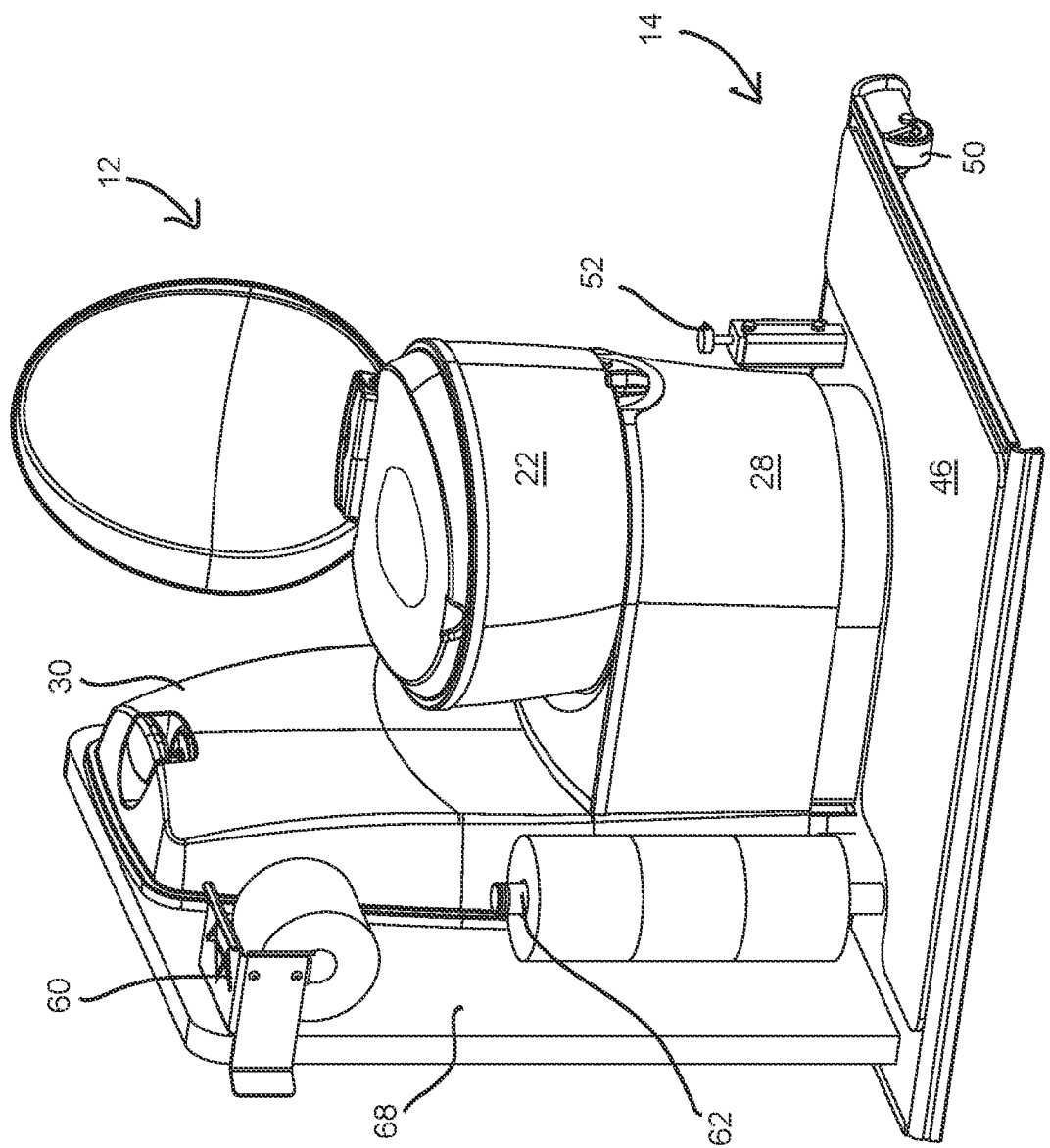
FIG. 10 is a front-side perspective view of the repositionable toilet of FIG. 1 and including toilet paper holders, the bowl of the toilet is shown rotated 180° as compared to FIG. 1.

The repositionable toilet system 10 is combined with the shower system 16 (FIGS. 2-5) and shower stall 18, to provide a dry bath configuration for a portable living quarter. The toilet 12 of system 10 of the illustrative embodiment is depicted as a flushable self-contained toilet with a removable waste holding tank or cassette 20 (FIG. 9). Examples of self-contained toilets include CASSETTE® brand toilets marketed by the Thetford Corporation of Ann Arbor, Mich. and described in U.S. Pat. No. 5,318,275, the disclosure of which is hereby incorporated herein by reference. The toilet 12 includes a bowl portion 22, a seat 24, a lid 26, a toilet base 28 positioned below the bowl 22, and a clean water holding tank 30. The clean water holding tank 30 is positioned adjacent the bowl 22 and in fluid communication with the bowl 22 to provide clean water to the bowl 22 for flushing the toilet 12. The cassette 20 is positioned within toilet base 28 and is in fluid communication with the bowl 22 to receive and retain waste from the bowl. A bottom portion of the bowl 22 includes an outlet port in fluid communication with the cassette 20 to direct waste from the bowl 22 to the cassette 20. A control valve is positioned proximate the outlet port of the toilet. The valve is movable between a closed position in which the valve is under the outlet port to provide a seal between the bowl 22 and the cassette 20 and an open position in which the valve is adjacent to or apart from the outlet port such that the port is open to permit waste to transfer from the bowl 22 through the outlet port and into the cassette 20. The toilet also includes an actuator or handle 29 to move the valve between the open and closed positions (FIGS. 1-6). The actuator 29 may include a manual, hand-operated flush system to facilitate the transfer of waste from the bowl 22 to the cassette 20. The cassette 20 is selectively removable from the toilet base 28 such that a user may remove the cassette 20 and empty it at a remote location apart from the portable living quarter, such as a waste recovery or dump station. The clean water holding tank 30 is refillable via a water fill port 30a (FIG. 9) such that once all the water has been transferred from tank 30 to bowl 22, a user may input more water into tank 30 and continue use of the toilet 12, assuming that the cassette 20 has remaining capacity to receive more waste.

In the illustrative embodiment of FIGS. 1-20, the bowl 22 is rotatably repositionable relative to toilet base 28. A lock 31 is positioned at a side of the toilet 12 between the bowl 22 and toilet base 28 and is selectively releasable to permit the bowl 22 to rotate about a vertical axis relative to the toilet base 28 (FIGS. 1-2, 4, and 8). As such, the toilet bowl 22 may be positioned at various angles within the living quarter as desired or as necessitated by the layout of adjacent components of the hygiene system. Once the bowl is in the desired position, the lock 31 may be closed or latched to secure the bowl 22 relative to the toilet base 28.

Figure 2:
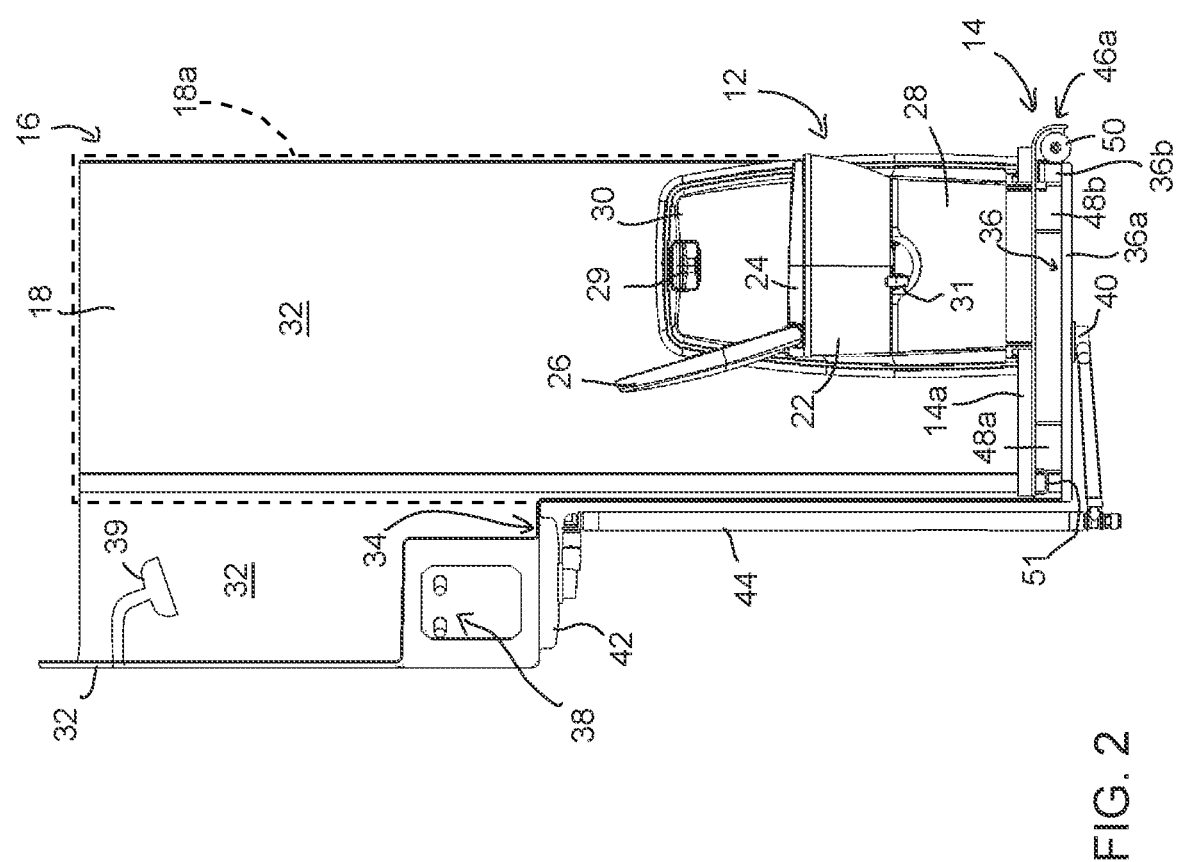
FIG. 2 is a front elevation view of the repositionable toilet of FIG. 1, shown installed at a shower system for a portable living quarter and depicted with the toilet in a stowed position.
Figure 3:
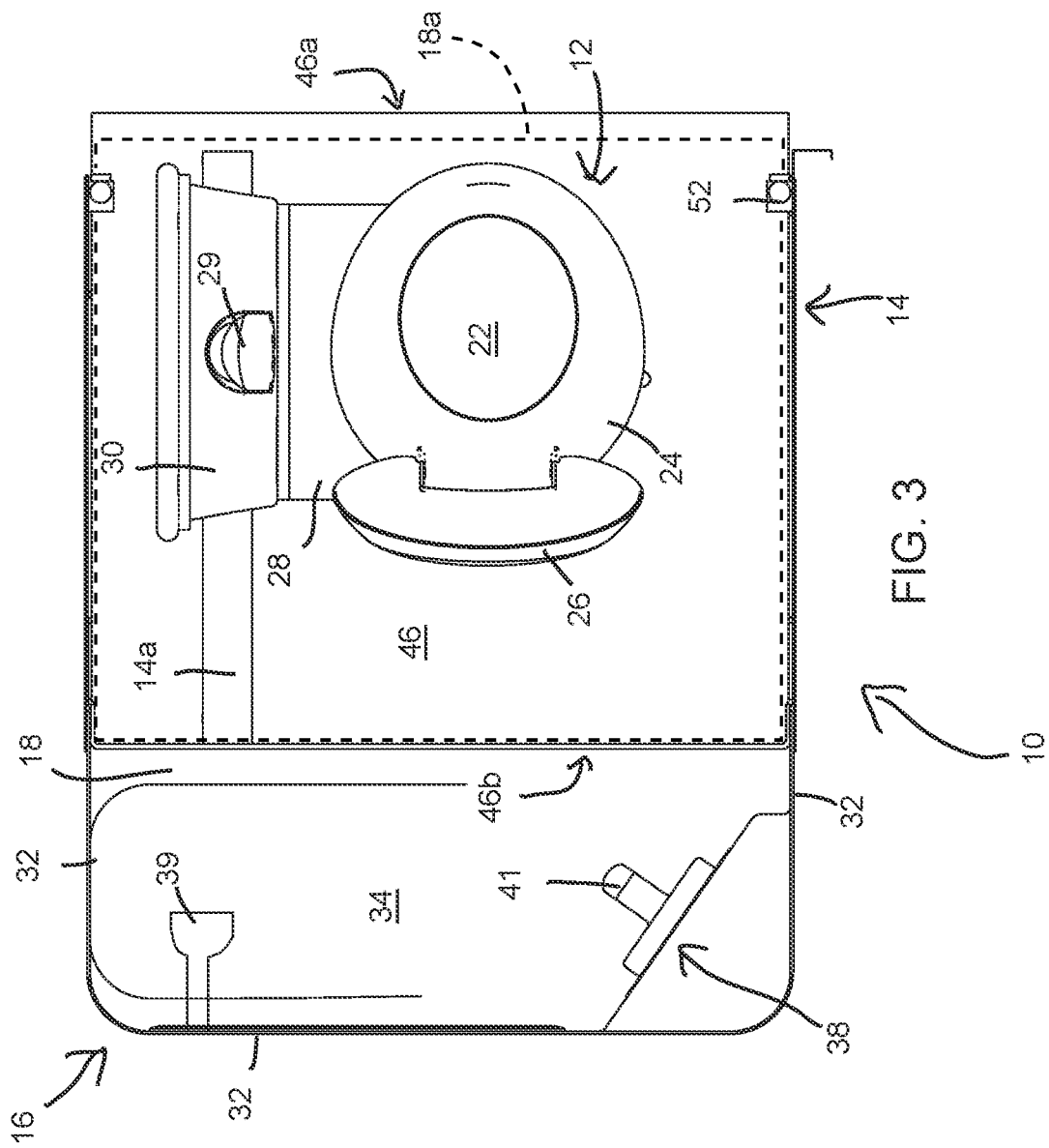
FIG. 3 is a top plan view of the toilet and shower system of FIG. 2.
Figure 4:
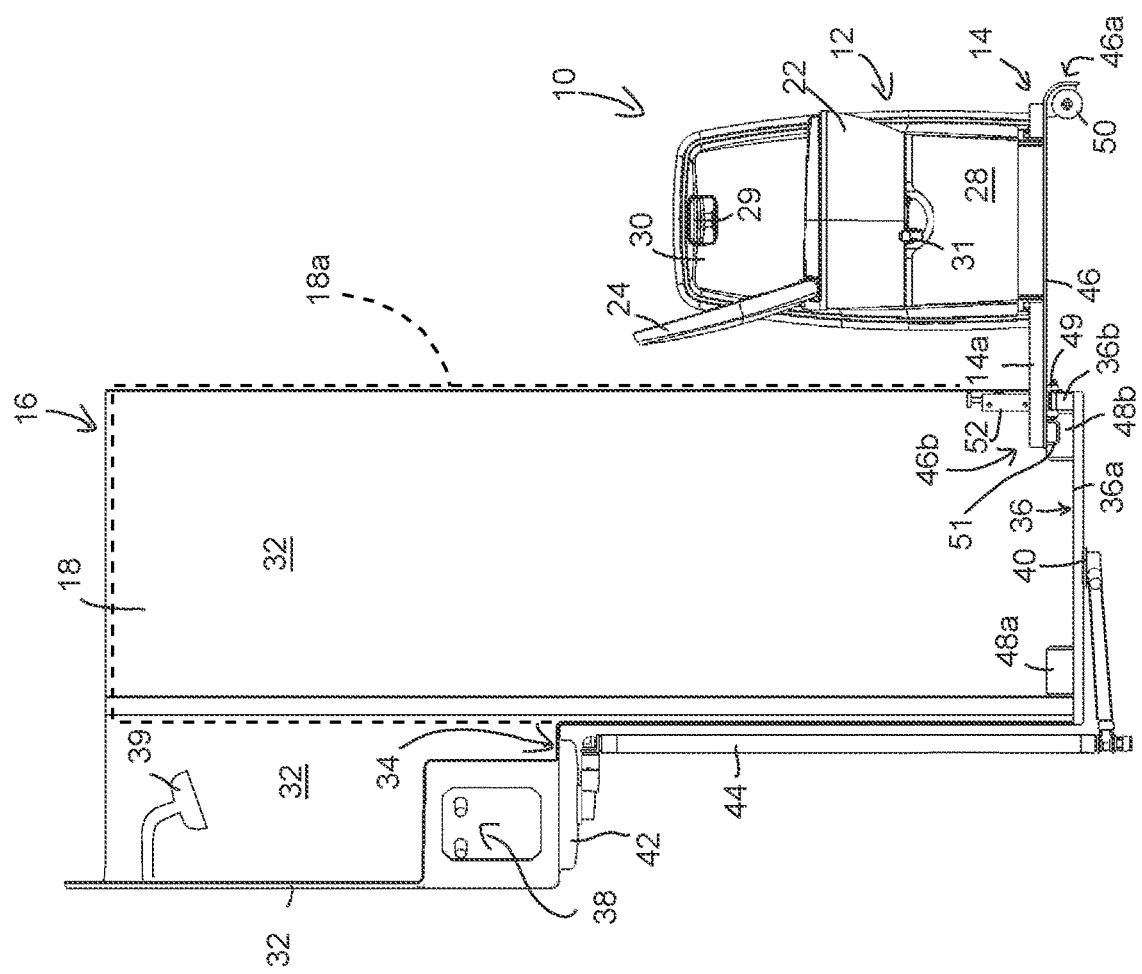
FIG. 4 is a front elevation view of the repositionable toilet and shower system of FIG. 2, depicted with the toilet in a deployed position.
Figure 5:
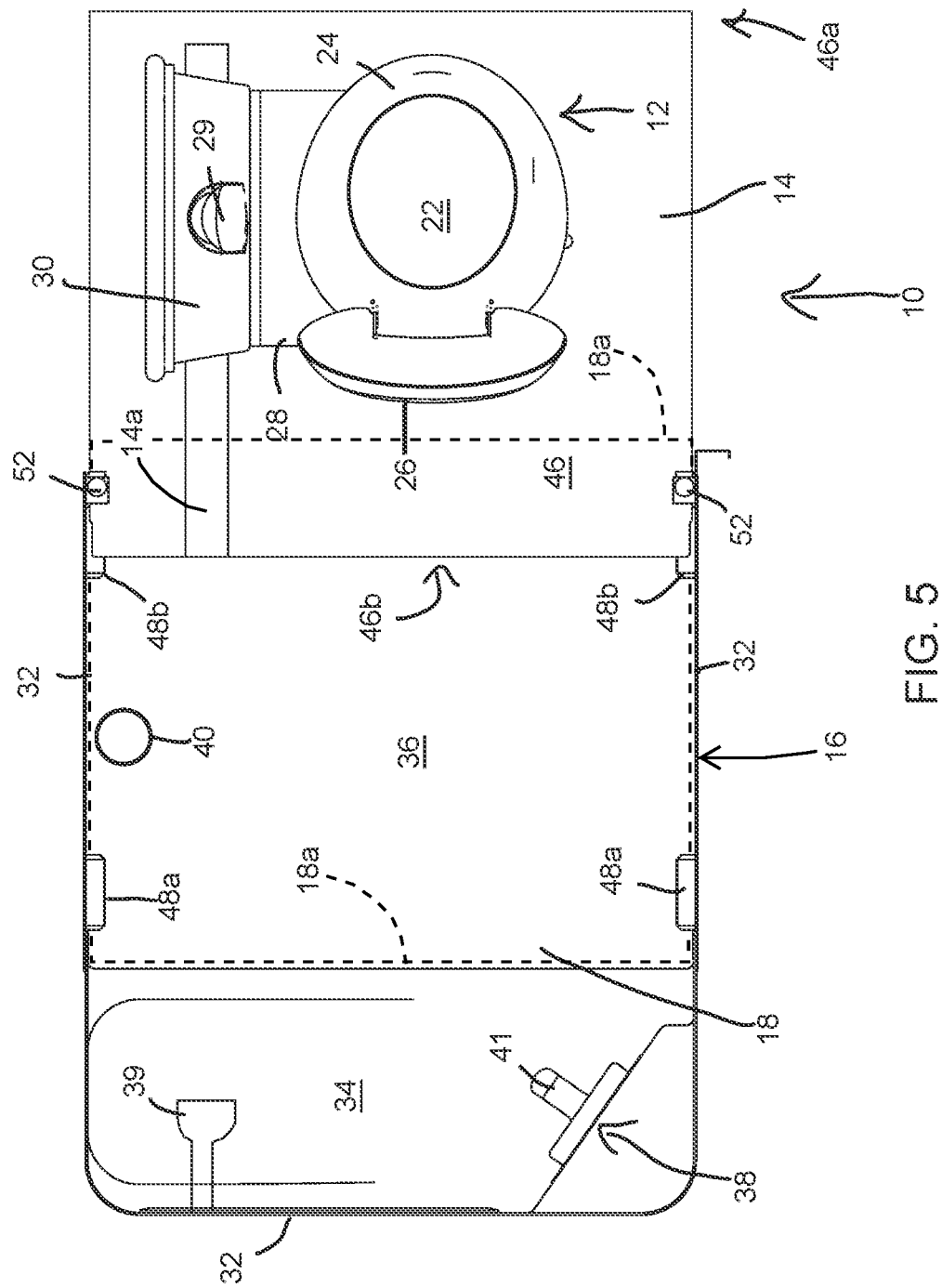
FIG. 5 is a top plan view of the toilet and shower system of FIG. 4.

In the illustrative embodiment of FIGS. 2-5 and 11-20, the shower system 16 may be one of many commercially available camper or RV shower systems. As shown, shower system 16 includes the shower stall 18 defined by a set of walls 32, a shelf or ledge 34, and a basin or floor 36. The shower system 16 includes a water supply or dispenser 38 coupled or plumbed with a shower head 39 to dispense water at an upper portion of the stall for bathing. The shower stall 18 directs dispensed water toward a floor drain 40 positioned within the floor 36 of the stall (FIGS. 2, 4, and 5). The shelf 34 of the stall 18 includes a sink basin 42 for collecting water dispensed from a faucet 41 of the dispenser 38 for activities such as hand washing. The sink basin 42 is plumbed with a drain pipe 44 to direct used water toward a waste water recovery system of the living quarter, such as a grey water tank. The floor drain 40 is also plumbed with the drain pipe 44 to direct used water from the shower to the living quarter waste water recovery system. It will be appreciated that a closet or other open space may be provided in place of the shower system 16, while providing a partially enclosed space for receiving the stowed platform 14. For example, a closet space may be provided to receive the stowed platform 14, and when the platform 14 is extended, the closet space may be usable for a reading nook or office space, and an extendable or deployable desk and/or chair may be provided within the closet space such that the user may extend or deploy the desk or chair when the platform 14 is extended outside the envelope of the closet space.

Figure 7:
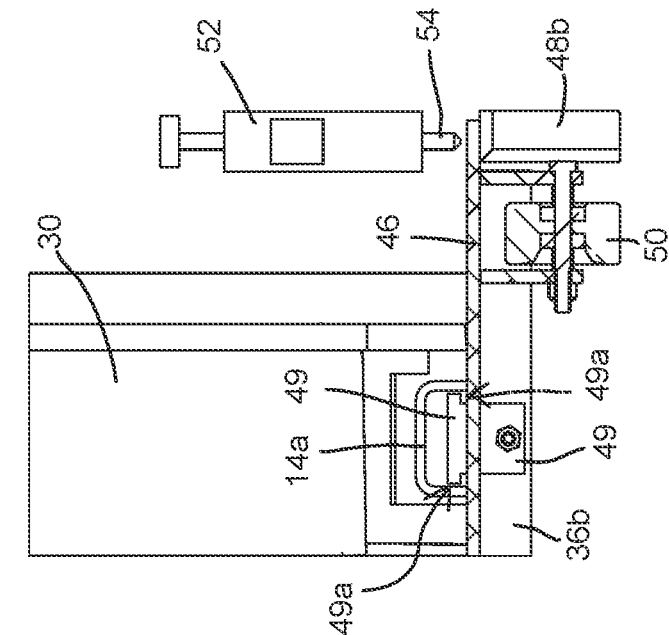
FIG. 7 is a sectional view taken along line VII-VII of FIG. 6.
Figure 6:
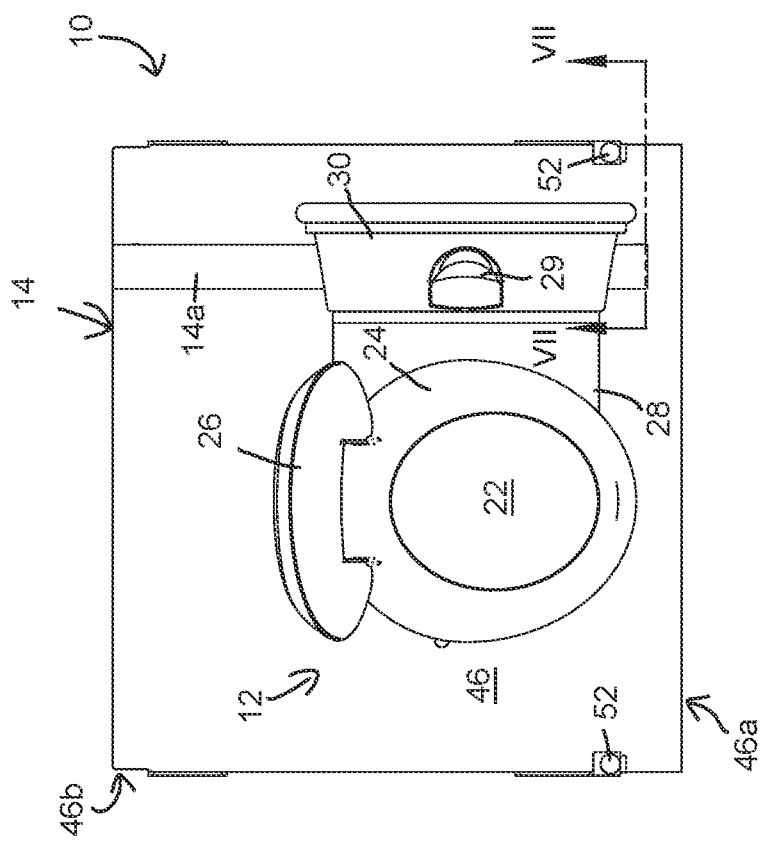
FIG. 6 is a top plan view of the repositionable toilet of FIG. 1.

The repositionable toilet system 10 includes the moveable toilet support platform 14 having a panel or base 46 that supports the toilet 12 and is selectively moveable between the stowed position and the deployed position (FIGS. 1-6 and 11-19). The toilet 12 is fixedly attached to platform 14 and moves relative to the shower stall 18 as the platform 14 moves. The moveable platform 14 is coupled to and supported at least partially within the shower stall 18 by a fixed support device in the form of a set of standoff inner supports or slide guides 48a, a set of outer supports or slide guides 48b, and a threshold platform retainer and slide guide 49 (FIGS. 2, 4, 5, and 7). The inner and outer guides 48a and 48b are each fixed to a lower portion of the shower stall, such as a curb 36a of the stall floor 36. The threshold guide 49 is fixed to a lower portion of the shower stall 18 at a middle portion of the shower threshold 36b (i.e. portion of stall floor at the entryway or opening to the shower; FIG. 7). The guides 48a, 48b, and 49 remain stationary within the shower stall 18 while the moveable platform 14 extends by sliding laterally and horizontally from inside the shower stall to outside the shower stall, and vice versa. Threshold guide 49 includes a pair of opposing extensions or tabs 49a (FIG. 7). Tabs 49a are dimensioned and shaped to extend over a portion of the moveable platform 14 to retain or substantially inhibit the platform 14 from raising or lifting vertically relative to the shower floor 36, while also permitting the platform 14 to move laterally. Other forms of vertical restraints are contemplated for inhibiting the platform 14 from raising or lifting vertically relative to the shower floor 36, such as channels supported at the lower portion of stall walls 32 and configured to slideably receive an edge or lip at the side of the platform 14, for example.

The moveable platform 14 includes a guide slot, keyway, or track to receive the threshold guide 49. The guide slot is formed by a gap through the surface of panel 46, the gap extending along the surface in the direction of travel of the platform 14. The platform 14 includes a cover or rail 14a that extends along a length of the surface of panel 46 and covers the guide slot as well as threshold guide 49 (FIGS. 1-9). The guide slot and threshold guide 49 are correspondingly shaped and dimensioned to permit the platform 14 to slide substantially freely in the lateral direction between stowed and extended positions.

The moveable platform 14 includes support wheels 50 coupled to the underside of the panel 46 at the outward or distal end 46a of panel 46 (FIGS. 1-2, 4, and 7-10, 12, 14, 16-17, and 19-20). The wheels 50 support the distal end 46a along the living quarter floor F adjacent to the stall floor 36. As best shown in FIGS. 4-5, the outer guides 48b, threshold guide 49, and wheel 50 cooperate to vertically support the moveable platform 14 in both the stowed and deployed positions, respectively. As best shown in FIGS. 1-3, the inner guides 48a cooperate with the outer guides 48b, threshold guide 49, and/or wheel 50 to vertically support the moveable platform only at or near the stowed position. The guides 48a, 48b, and 49 are preferably formed of a resilient and low-friction material, such as ultra-high molecular weight (UHMW) polymer, for example. A stop or bumper 51 is coupled to a lower portion of the proximal end 46b of the surface of panel 46 to stop platform 14 from extending too far outward from the shower 16 (FIGS. 1, 2, 4, and 9). The bumper 51 is dimensioned and shaped to impact the shower threshold 36b, at which point the platform 14 is at its maximum extension, as illustrated in FIG. 4. It is contemplated that guides 48a, 48b, and 49 may be omitted without substantially affecting the function of the platform to move between the stowed and extended positions. For example, the platform 14 may be coupled to the floor 36 in a manner such that the platform is vertically supported substantially only on wheels, including wheels 50, at the stall floor 36 or at a mat on the stall floor, such as a teak wood shower mat or platform.

In the stowed position of FIGS. 2, 3, 11, 12, 15, and 16, the platform 14 is positioned substantially within the envelope 18a of the shower stall 18 (i.e. within the perimeter of the stall) such that the toilet 12 is inside the shower stall, with a portion of the distal end 46a protruding outside the stall envelope. The panel 46 substantially covers the guides 48a and 48b when in the stowed position. In the deployed/extended position of FIGS. 4-5, 13-14, and 17-20, the platform 14 is substantially positioned outside or beyond the envelope 18a of the shower stall 18 such that the toilet 12 is outside the shower stall 18, with a portion of an inward or proximal end 46b of panel 46 remaining inside the stall envelope 18a. The inner guides 48a and a portion of each of the outer guides 48b are uncovered when the platform 14 is in the extended position. The cassette 20 is best accessed from the rear of the toilet 12 when the system 10 is in the deployed/extended position.

It will be appreciated that while the system 10 of illustrative embodiment includes threshold guide 49 that secures the platform in the vertical direction, the moveable platform 14 may be coupled to and supported only vertically at the stall floor 36 without a vertical restraint. For example, the platform 14 may be supported only at the sides of the platform 14, such as on the outer guides 48a and 48b or in slide channels supported on the stall floor 36 or stall walls adjacent the platform, and/or at the wheels 50. Thus, the stall floor 36 acts as a support that vertically supports the platform 14 at the shower stall 18, adjacent the floor F of the living quarter (FIGS. 12, 14, 16 and 19).

A pair of locks 52 are provided proximate the outer guides 48b to lock or secure the toilet 12 and the platform 14 in either of the stowed position or the deployed position, as desired, for safety during use and during transport of the portable living quarter (FIGS. 1 and 3-7). Each lock 52 includes a slideable locking pin 54 that is selectively insertable into a receiver hole in the panel 46 and/or into a receiver hole in the corresponding outer guide 48b. While the toilet 12 may be more comfortable and more easily accessible in the extended position of FIGS. 4-5, 13-14, and 17-20, it will be appreciated that toilet 12 is fully functional in the stowed position of FIGS. 2-3, 11-12, and 15-16 as well, and thus may be used inside or outside the shower stall 18, as desired.

Figure 19:
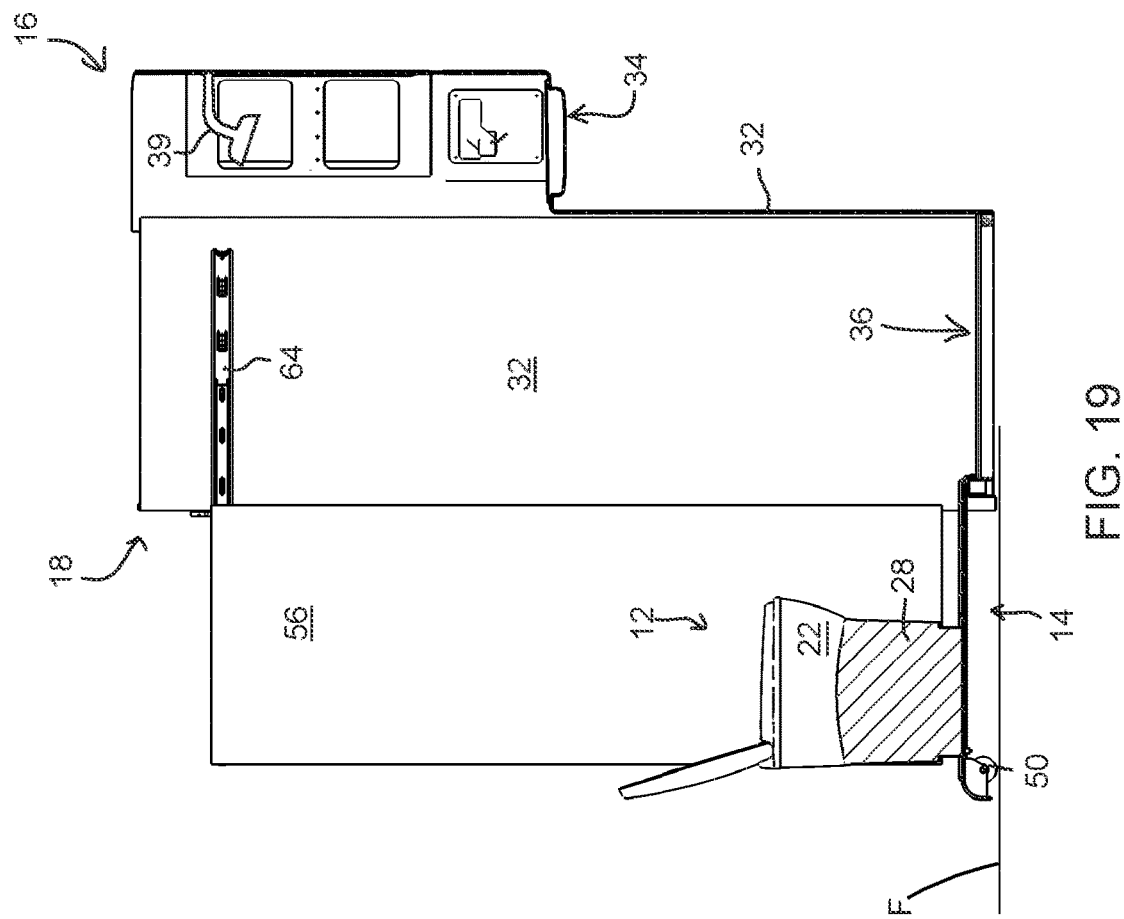
FIG. 19 is a sectional view taken along line XIX-XIX of FIG. 18.

Optionally, accessories may be provided with the repositionable toilet system 10, including a privacy door, wall, or panel 56, a repositionable articulating or pivoting clothing or equipment hanger or rod 58, a toilet paper holder 60, and a spare toilet paper support or rod 62, such as shown in FIGS. 10-20. The privacy wall 56 is independently movable relative to the repositionable toilet support platform 14 such that the wall 56 may move between a stowed or open position as depicted in FIGS. 11, 15, and 16, and an extended or privacy position as depicted in FIGS. 13, 18, and 19, regardless of the positioning of the platform 14. In this manner, the privacy wall 56 may be positioned to seal or visually obstruct at least a portion of an opening 57 (FIGS. 13 and 18) to provide privacy or otherwise block access between the water closet and the remainder of the living quarter. An upper track or guide rail 64 is provided between the upper or distal end of the wall 56 and the wall 32 of the shower stall 18 (FIG. 19). A portion of the upper end of wall 56 slideably engages the track 64 to provide support to the wall 56 as it moves relative to the wall 32 and in each of the stowed and extended positions. Optionally, a lower track or guide rail may be provided between the lower or proximal end of the wall 56 and the floor of the living quarter to slideably support the wall 56. While the privacy wall 56 and platform 14 are described above as being moveable independent of one another, it will be appreciated that the privacy wall may be coupled to the platform 14 (such as at a base or proximal end of the wall 56, for example) such that the wall 56 and platform 14 move in unison with one another. Optionally, the wall 56 may support a mirror, such as a mirror directed toward/visible from the living quarters (i.e. away from the water closet). A lower edge or portion of the wall 56 may be configured to cover a portion of the platform 14 to limit or inhibit vertical movement of the platform 14, such as while the platform 14 and wall 56 are stowed.

Figure 20:
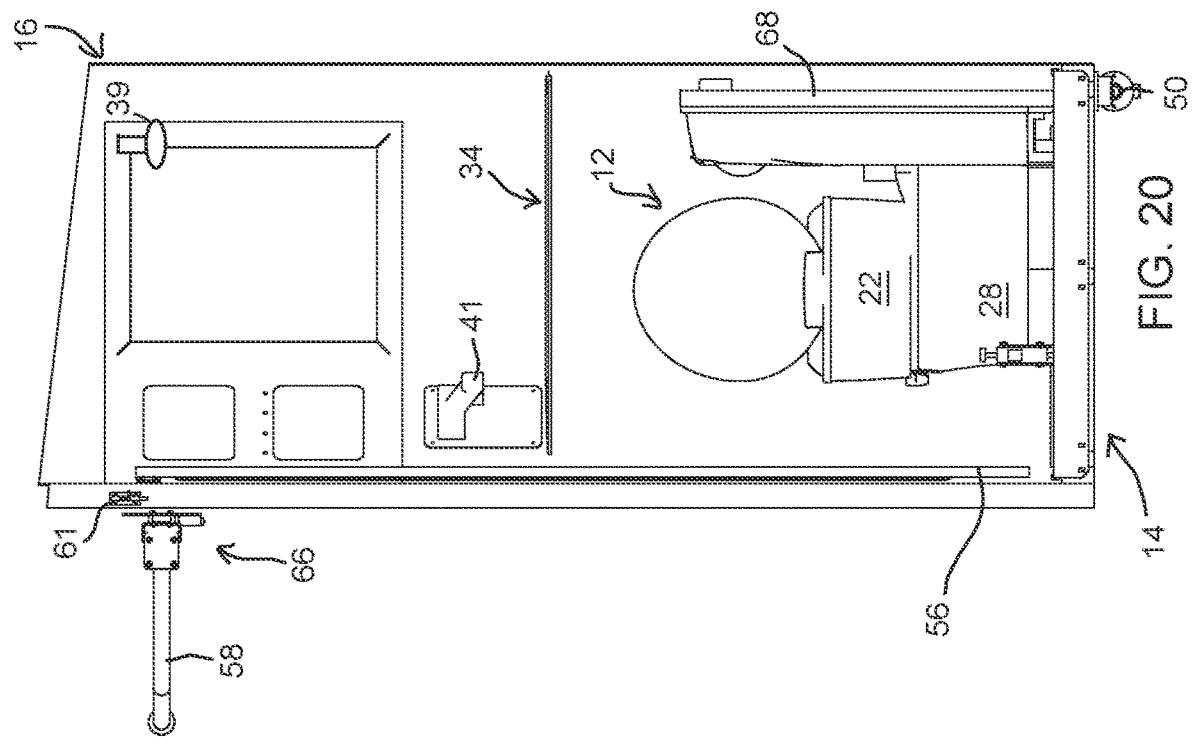
FIG. 20 is a sectional view taken along line XX-XX of FIG. 18.

The clothing hanger 58 is coupled to an exterior portion of the wall 32 of the shower stall 18 (e.g. a wall of the living quarter outside of the water closet) and proximate the entryway to the water closet. The hanger 58 is formed of a first arm or bar 58a and a second arm or bar 58b extending perpendicularly from the distal end of arm 58a (FIG. 11). One or both of the arms 58a and 58b are supported in a horizontal orientation to support hanging equipment, such as clothing on clothing hangers. A pivot mechanism 66 secures the hanger 58 to the wall 32 at the proximal end of arm 58a and enables the hanger 58 to be positioned either inside the water closet (such as when the privacy wall 56 is stowed as shown in FIGS. 11, 12, 15, 16, and 17) or outside the water closet and inside the rest of the living quarter (such as when the privacy wall 56 is extended as shown in FIGS. 18 and 20). The hanger 58 is configured such that the second arm 58*b* extends generally perpendicularly away from the interior of wall 32 when deployed into the water closet and such that the second arm 58*b* extends generally perpendicularly away from the exterior of wall 32 when deployed outside the water closet and into the rest of the living quarter. As best shown in FIGS. 17 and 20, a locking mechanism in the form of sliding pin latch 61 is provided for locking the hanger 58 in a desired position (e.g. extending into the water closet or extending into the living quarter). The hanger 58 may provide a locking or securing measure for securing the privacy wall 56 in its stowed position, such as while the vehicle is in transport (see FIGS. 15 and 16 depicting the hanger 58 positioned around the privacy wall 56).

The toilet paper holder 60 is supported adjacent to the toilet 12 at a vertical wall or back panel 68 that is coupled to or positioned behind the clean water holding tank 30 of the toilet 12 (FIGS. 10-15, 17, 18, and 20). The cassette 20 is accessible from the rear of the toilet 12 through the panel 68 when the system 10 is in the deployed/extended position. The spare toilet paper support 62 is mounted to surface 46 of the platform 14. As configured in the illustrative embodiments the toilet paper holder 60 and spare toilet paper support 62 move with the platform 14. The toilet paper holder 60 may be configured to support an item above the roll of toilet paper, such as for supporting a cell phone, or the like. The toilet paper holder 60 may be positioned and configured to provide a hook or grip for holding a shower curtain outside of the shower stall 18 when the platform 14 is in the extended position.

While the toilet 12 of the repositionable toilet system 10 as described herein is a self-contained system that is not plumbed directly into any supply or drainage lines of the portable living quarter, it will be appreciated that a commonly known standard type toilet may be provided with the repositionable toilet system. In such an embodiment, the standard type toilet may be plumbed with a clean water connection to refill the bowl 22 and/or clean water tank 30 directly from a water source of the portable living quarter or other water supply. The bowl 22 may be plumbed with a drain line coupled to a remote waste holding tank of the living quarter, or a waste drain pipe. For example, a flexible water supply line and/or a flexible waste line may be provided with the toilet to plumb it directly into the living quarter's water supply and waste recovery systems or to water and waste facilities at a campground, for example, to alleviate the need for a user to manually refill the clean water or empty the waste tank. Further optionally, the toilet system 10 may include a power source to move clean water and/or waste to and from the toilet 12. For example, an electric flushing system may be provided to automatically flush waste from the bowl 22.

Additional forms of toilets or commodes may be provided with the repositionable toilet system. For example, a composting type toilet may be supported at and/or fixed to the movable platform 14. In such an embodiment, the composting type toilet may be plumbed with a flexible vent line or hose between the toilet and the exterior of the living quarter. The flexible vent line permits the toilet to move with the platform and is provided to contain and direct gases away from a holding tank portion of the composting toilet to the exterior of the living quarter. Additionally, an electric power supply, in the form of an extendable or flexible power cord, may be provided between the composting toilet and an electrical source of the living quarter (e.g. battery, solar panel, electricity generator, etc.) to provide power to the toilet. For example, the electric power supply may deliver electricity to an airflow fan installed at the toilet's holding tank, and the fan facilitates composting of the waste in the toilet by moving air over waste in the holding tank. The flexible power cord permits the toilet to move with the platform while still providing electricity to the toilet, regardless of the position of the platform 14.

While the repositionable toilet system 10 is particularly well-suited for supporting a toilet to provide a dry bath while only occupying a required space about the same as commonly known wet bath configurations, the toilet 12 may be omitted and other structures or equipment may be supported on the platform 14, as will be appreciated. In such embodiments, the other structures or equipment supported on the platform 14 may therefore be stowed inside of the shower stall 18 when the shower is not in use. For example, storage closets, drawers, and/or an armoire could be supported on the platform 14 and the closets, etc. may be accessed by a user when the platform is extended outwardly from the shower stall 18. The closets, etc. may be situated such that they remain accessible when the platform 14 is stowed within the shower stall 18. In another exemplary embodiment, a vanity counter, desk, or table may be supported on the platform 14. The vanity counter may include a slide-out or extendable seat permitting a user to sit next to or partially beneath the vanity counter. Alternatively, with the platform 14 extended outwardly from the shower stall 18, the vanity counter may be accessible by a user on a chair or stool. As such, a user may position their chair next to or partially beneath the vanity counter. The vanity counter, etc. may be situated such that it remains accessible when the platform 14 is stowed within the shower stall 18.

Thus, a repositionable toilet system is provided for a camper or RV to provide a dry bath configuration in a manner that optimizes space usage and/or allows for a dry bath configuration in smaller sized campers, RVs, and boats. The dry bath toilet system enables a user to stow the toilet within the envelope of the shower stall when the shower and/or toilet are not in use, such as when the camper or RV is being transported, for example. A user may extend or deploy the toilet outside of the shower envelope in order to use the toilet and to access and use the shower. With the toilet system in the extended position the shower provides a full size shower without the user having to step over or around the toilet and without soaking the toilet with shower water. The toilet may be self-contained such that it is refillable and emptyable as necessary or the toilet may be plumbed into a water supply and waste recovery system of the RV or camper.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A repositionable toilet system comprising:
a toilet; and
a moveable platform supporting said toilet, wherein said platform is horizontally extendable relative to a floor that vertically supports said platform;
wherein said toilet is coupled to said platform such that said toilet is moveable horizontally between a stowed position and an extended position.

2. The toilet system of claim 1, wherein said moveable platform is disposed at a shower stall of a living quarter and the floor comprises a portion of the shower stall, wherein in said stowed position said toilet is positioned substantially within an envelope of the shower stall and in said extended position said toilet is positioned substantially outside of the envelope of the shower stall.

3. The toilet system of claim 2, further comprising a privacy panel moveably coupled to a portion of the living quarter and moveable between an open position and a privacy position, wherein said privacy panel is configured to seal a portion of an opening between the shower stall and another portion of the living quarter when in the privacy position.

4. The toilet system of claim 2, further comprising a repositionable equipment hanger coupled to a portion of the living quarter and moveable between a first position wherein said hanger is substantially within the shower stall and a second position substantially outside the shower stall.

5. The toilet system of claim 1, wherein said toilet comprises a bowl and a waste holding tank, wherein said waste holding tank comprises a removable cassette for receiving and containing waste received from said bowl, wherein said cassette is accessible and removable from said toilet when said toilet is in said extended position.

6. The toilet system of claim 1, wherein said platform comprises a wheel supporting a distal end of said platform along a floor surface subjacent to said platform.

7. The toilet system of claim 1, further comprising a lock to secure said toilet in either of said stowed position and said extended position.

8. A hygiene system for a portable living quarter, said hygiene system comprising:
   a shower system comprising a shower stall having side walls and a floor;
   a toilet;
   a toilet support platform moveably coupled to said shower stall proximate said floor of said shower stall such that said platform is horizontally extendable relative to said shower stall;
   said toilet coupled to said toilet support platform such that said toilet is moveable between a stowed position within said shower stall and an extended position outside said shower stall.

9. The hygiene system of claim 8, wherein said toilet comprises a removable waste holding tank cassette for receiving and containing waste from a bowl of said toilet, wherein said cassette is accessible and removable from said toilet when said toilet is in said extended position.

10. The hygiene system of claim 8, further comprising a wheel supporting a distal end of said platform along a floor surface adjacent said floor of said shower stall.

11. The hygiene system of claim 10, further comprising a lock to secure said toilet in either of said stowed position and said extended position.

12. The hygiene system of claim 8, further comprising a privacy panel moveably coupled to a portion of the living quarter and moveable between an open position and a privacy position, wherein said privacy panel is disposed between said shower stall and another portion of the living quarter when in the privacy position.

13. The hygiene system of claim 8, further comprising a repositionable equipment hanger coupled to a portion of the living quarter and moveable between a first position wherein said hanger is within said shower stall and a second position outside said shower stall.

14. A repositionable platform system for a portable living space, said platform system comprising:
   a closet;
   a moveable platform configured to support an equipment item; and
   a support that vertically supports said platform at an adjacent structure;
   wherein said closet comprises a floor, a plurality of walls, and an entryway for entering said closet, said walls and said entryway defining a perimeter envelope of said closet; and
   wherein said platform is horizontally extendable relative to said support between a stowed position and an extended position, wherein in said stowed position said equipment item is positioned within the envelope of said closet and in said extended position said equipment item is positioned outside of the envelope of said closet.

15. The repositionable platform system of claim 14, wherein said equipment item comprises a toilet.

16. The repositionable platform system of claim 15, wherein said closet comprises a shower stall.

17. The repositionable platform system of claim 16, further comprising a privacy panel moveably coupled to a portion of the living space and moveable between an open position and a privacy position, wherein said privacy panel is configured to provide access through the entryway to the shower stall in the open position and to seal at least a portion of an opening between the shower stall and another portion of the living space when in the privacy position.

18. The repositionable platform system of claim 14, further comprising a lock to secure said platform in either of said stowed position and said extended position.

19. The repositionable platform system of claim 14, wherein said equipment item comprises one or more chosen from a toilet, a drawer chest, an armoire, a vanity counter, a desk and a table.

20. The repositionable platform system of claim 14, wherein said equipment item comprises one chosen from a vanity counter or a desk, and an extendable seat adjacent said vanity counter or desk.

* * * * *